(12) United States Patent
Van Scyoc (10) Patent No.: US 9,909,703 B2
(45) Date of Patent: Mar. 6, 2018

(54) FLUID COUPLING AND METHOD

(71) Applicant: Dixon Quick Coupling, Dallas, NC (US)

(72) Inventor: Tom Van Scyoc, Gastonia, NC (US)

(73) Assignee: Dixon Quick Coupling, Dallas, NC (US)

( * ) Notice: Subject to any disclaimer, the term of this patent is extended or adjusted under 35 U.S.C. 154(b) by 204 days.

(21) Appl. No.: 14/985,590

(22) Filed: Dec. 31, 2015

(65) Prior Publication Data

US 2017/0191595 A1    Jul. 6, 2017

(51) Int. Cl.

| | |
|---|---|
| *F16L 29/04* | (2006.01) |
| *F16L 37/32* | (2006.01) |
| *F16L 37/36* | (2006.01) |
| *F16L 37/23* | (2006.01) |
| *F16L 37/10* | (2006.01) |
| *F16L 37/26* | (2006.01) |

(Continued)

(52) U.S. Cl.
CPC .............. *F16L 37/32* (2013.01); *F16L 29/04* (2013.01); *F16L 37/23* (2013.01); *F16L 37/36* (2013.01); *F16L 37/0841* (2013.01); *F16L 37/101* (2013.01); *F16L 37/138* (2013.01); *F16L 37/26* (2013.01); *F16L 2201/20* (2013.01); *Y10T 137/7856* (2015.04); *Y10T 137/87957* (2015.04); *Y10T 137/87965* (2015.04)

(58) Field of Classification Search
CPC ... F16L 2201/00; F16L 2201/20; F16L 29/04; F16L 37/0841; F16L 37/10; F16L 37/101; F16L 37/138; F16L 37/22; F16L 37/23; F16L 37/244; F16L 37/26; F16L 37/30; F16L 37/32; F16L 37/36; Y10T 137/7854; Y10T 137/7855; Y10T 137/7856; Y10T 137/7857; Y10T 137/9029; Y10T 137/87925; Y10T 137/87941; Y10T 137/87949; Y10T 137/87957; Y10T 137/87965; Y10T 137/87973
USPC .............. 137/515, 515.3, 515.5, 515.7, 614, 137/614.02, 614.03, 614.04, 614.05, 137/614.06, 798; 251/149, 149.8, 149.9
See application file for complete search history.

(56) References Cited

U.S. PATENT DOCUMENTS 2,512,999 A * 6/1950 Bruning .................. F16L 37/23
137/614.04
2,548,528 A * 4/1951 Hansen .................... F16L 37/23
137/536

(Continued)

*Primary Examiner* — Mary McManmon
*Assistant Examiner* — Richard K Durden
(74) *Attorney, Agent, or Firm* — Howson & Howson LLP (57) ABSTRACT

A coupling and method are provided that include a coupler and nipple. The nipple has a valve in a normally-closed position and an outer peripheral surface with a plurality of spaced-apart, close-ended cam paths. The coupler has a valve in a normally-closed position and includes a set of latching balls for engagement with the cam paths to secure the coupler to the nipple. The coupler further includes a sleeve mounted thereon and movable between forward and retracted positions. In the forward position, the latching balls are forced into an inward position that prevents release of the latching balls from the cam paths, and in the retracted position, the latching balls are permitted to extend to an outward position enabling initial engagement with or disengagement from the cam paths. The coupler also includes a set of locking balls that prevents movement of the sleeve to the retracted position.

18 Claims, 12 Drawing Sheets

(51) Int. Cl.
*F16L 37/084* (2006.01)
*F16L 37/138* (2006.01)

(56) References Cited

U.S. PATENT DOCUMENTS

| | | | | |
|---|---|---|---|---|
| 2,648,553 | A * | 8/1953 | Ulrich | F16L 37/107 137/614.04 |
| 2,705,159 | A * | 3/1955 | Pfau | F16L 37/23 137/614.03 |
| 3,112,767 | A * | 12/1963 | Cator | F16L 37/23 137/614.06 |
| 3,165,340 | A | 1/1965 | Kuehl et al. | |
| 3,570,543 | A * | 3/1971 | Ekman | F16L 37/23 137/614.04 |
| 3,631,597 | A * | 1/1972 | Lieb | A61C 1/14 279/50 |
| 4,114,853 | A * | 9/1978 | Medvick | F16L 37/23 251/149.6 |
| 4,543,993 | A | 10/1985 | Calvin et al. | |
| 4,683,921 | A | 8/1987 | Neeser | |
| 5,088,436 | A | 2/1992 | Stritmatter | |
| 5,211,197 | A * | 5/1993 | Marrison | F16L 37/23 137/614 |
| 5,709,243 | A * | 1/1998 | Wells | F16L 37/23 137/614.01 |
| 5,893,391 | A | 4/1999 | Jenski, Jr. | |
| 6,206,432 | B1 | 3/2001 | Kamiyama | |
| 7,258,127 | B1 | 8/2007 | Schneider | |
| 8,191,932 | B2 | 6/2012 | Davis | |
| 8,205,914 | B2 | 6/2012 | Chappaz et al. | |
| 8,844,555 | B2 | 9/2014 | Schneider | |
| 2005/0046178 | A1 * | 3/2005 | Sato | F16L 37/23 285/81 |
| 2007/0257485 | A1 | 11/2007 | Arosio | |
| 2013/0334814 | A1 * | 12/2013 | Tiberghien | F16L 21/08 285/399 |
| 2014/0117664 | A1 | 5/2014 | Ekstrom | |

* cited by examiner

FLUID COUPLING AND METHOD

BACKGROUND

This disclosure relates to a fluid coupling such as for use during the transfer or bulk delivery of a cryogenically controlled liquid, such as carbon dioxide, and to methods of connection to form the coupling and disconnecting of the coupling.

By way of example, the beverage industry uses carbon dioxide ($CO_2$) for carbonation, and for purposes of re-supplying carbon dioxide to a large consumer, such as a restaurant, service center, or like facility, carbon dioxide is typically transported in a cryogenically controlled liquid form in a relatively large $CO_2$ supply tank on a delivery truck. The restaurant or like business may have a free-standing $CO_2$ tank located exterior of the building or may have a fill line permanently plumbed to the exterior wall of the building or like facility. For purposes of beginning a fill process, the truck operator connects a supply hose having a coupler to a fitting or nipple on an exterior tank or fill line of the facility, which may be within a lock box or the like, to thereby connect the supply tank to the fitting and enable bulk fluid delivery of carbon dioxide in liquid form to the consumer. Following the fill process, the coupler is disconnected from the nipple.

Cryogenically controlled liquids, such as carbon dioxide, need to be handled with care upon transferring from the supply tank to the receiving facility. In particular, the processes of connecting and disconnecting the coupler to and from the nipple can cause problems, and safe and reliable connection and disconnection are difficult due to the extremely low temperature and high pressure of the cryogenically controlled liquid to be transferred.

By way of example, while mechanical threaded connections have conventionally been used for providing such couplings or connections, various problems are encountered during connection and disconnection operations due to the low temperature, high pressure, and like characteristics of the cryogenically controlled liquid being delivered. For instance, couplings, surrounding support structures, containment boxes, and like components are often subject to damage while they become beaten as the coupler is being engaged to the nipple during connection and released from the nipple during disconnection. For instance, a rear sleeve clip or other like component can become loose on the coupler resulting in a free connection that creates a dangerous condition for the operator, especially if the coupler valve stays or sticks in an open condition thereby resulting in a hose-whip or kick-back condition.

In addition, coupler valves have a tendency to remain open after disconnection due to freezing and stiction issues, and operators are typically exposed to excessively high levels of $CO_2$ during connection/disconnection processes. Further, seals and related components used to form seals within couplings can frequently and easily become damaged in the process.

Accordingly, couplings for $CO_2$ and like cryogenically controlled liquid delivery systems have been problematic and unsafe. The problems encountered typically extend loading and unloading times, increase costs, and produce frequent product failures.

Although problems specifically with the bulk delivery of $CO_2$ in the beverage industry are referenced above, these same problems can also relate to the loading, unloading, or transfer of any cryogenically controlled liquid in any industry.

DETAILED DESCRIPTION

According to an embodiment, a coupling is provided for use in cryogenic applications such as for the delivery of cryogenically controlled liquid carbon dioxide as discussed above. Of course, the coupling may be used for the delivery of other cryogenically controlled liquids or may be used in any other application requiring a fluid coupling and is not limited to cryogenic applications.

According to an embodiment, the coupling has a locking-cam system that enables connection and disconnection procedures to be accomplished quickly with no-tools and with greatly reduced $CO_2$ or like undesired release and exposure to operators. This system prevents accidental disconnection of the coupling and ensures that fluid tight seals are formed in the coupling before any internal valves are urged into an open flow condition.

Figure 1:
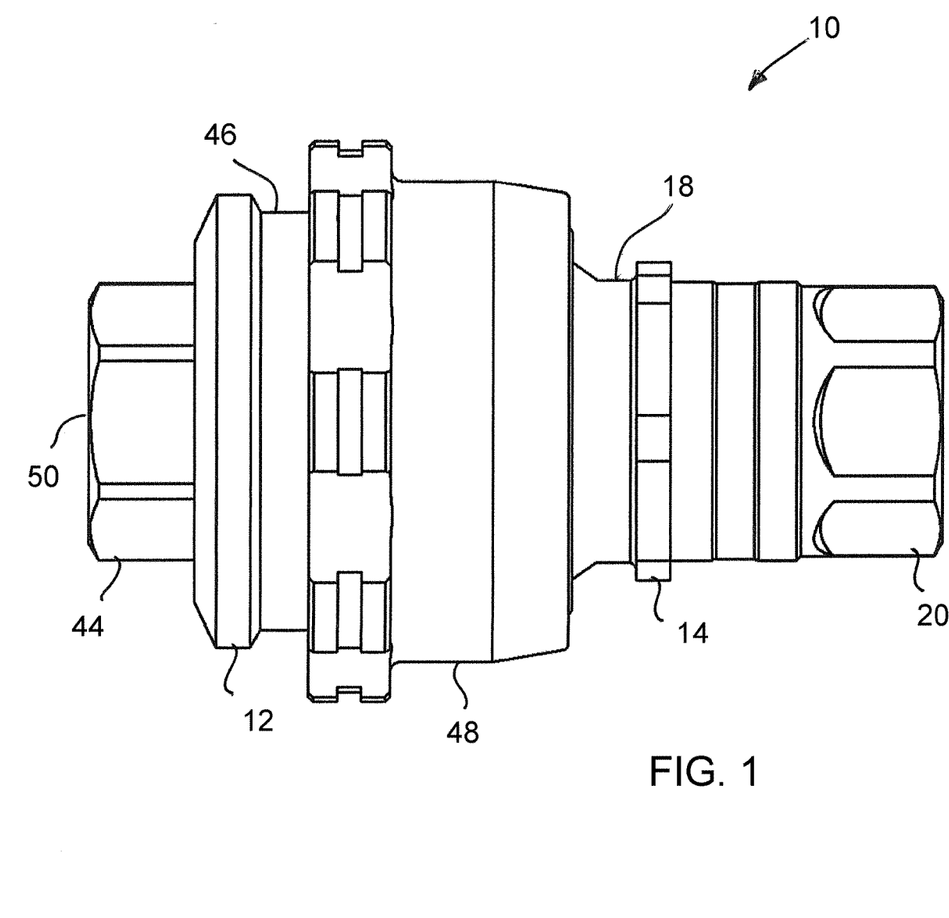
FIG. 1 is an elevational side view of a coupling including a coupler fully connected to a nipple in accordance with an embodiment.

By way of example, the coupling 10, such as shown in FIG. 1, includes a coupler 12 and a nipple 14. The nipple 14 may be connected to the terminating end of a fill line (not shown) or a free-standing storage tank (not shown) and permanently reside at the facility receiving a supply or bulk delivery of a cryogenically controlled liquid. The coupler 12 may be fastened to the end of a hose (not shown), hose fitting (not shown) or the like extending from a supply tank (not shown) on a delivery truck (not shown).

As explained in greater detail below, valve operation within the coupling 10 is staged to ensure a sealed condition before the valve within the nipple 14 (i.e., the receiving side of the coupling 10) is urged to an open position permitting flow through the nipple. In addition, valve operation within the coupling 10 is such that a valve in the coupler 12 (i.e., the delivery side of the coupling 10) is urged to an open flow condition during an intermediate stage of connection before the valve in the nipple 14 is urged to an open flow condition during a final stage of connection. Conversely, the valve in the coupler 12 is returned to the normally-closed no-flow condition after the valve in the nipple 14 is returned to a normally-closed condition during disconnection.

The coupling 10 simplifies the connection and disconnection processes of a delivery, requires the use of no tools during connect/disconnect processes, enables the time needed for a delivery to be reduced, and ensures that the delivery process remains safe for the operator at all times. Further, the coupling 10 minimizes the operator's exposure to the unwanted release of $CO_2$ or like fluid during connection and disconnection processes, and provides an improved seal and valve closure with an elastomerically energized ultra-high molecular weight (UHMW) Cup-Seal system to ensure connection longevity. The coupling 10 can be designed to compensate for a pressurized connection or residual pressure in a no-flow condition and can provide improved flow performance with reduced pressure drop. Valve/coupling stiction and freezing conditions are minimized due to the structure of the coupling and may be further minimized via the use of a PTFE impregnated nickel coating or like.

Turning first to the structure of the nipple 14 (i.e., the receiving side of the coupling 10) shown in FIGS. 2-5, it includes a hollow nipple body 18 and a hollow connection adapter 20 with a valve 22, valve guide 24 and valve spring 26 captured therebetween.

Figure 5:
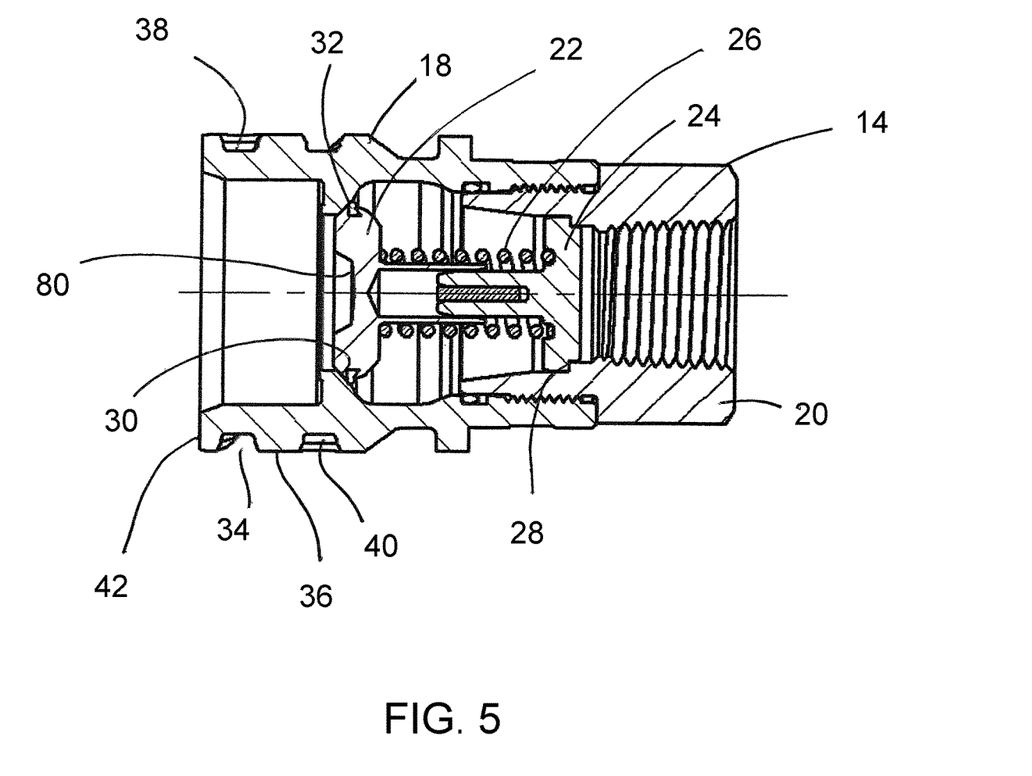
FIG. 5 is a cross-sectional view along the length of a nipple in accordance to an embodiment.

The connection adapter 20 is located at the distal end of the nipple 12 (i.e., distal relative to the coupler 12) for direct connection, for instance, to the end of the fill line of the facility (i.e., the nipple 14 may form a permanent terminal end of the fill line on an external wall of the facility or the nipple 14 may be connected to a free-standing storage tank). The nipple body 18 may form a threaded and sealed connection with the connection adapter 20 as best shown in FIG. 5 to provide the nipple 14 as an integral component.

The valve guide 24 is held in a stationary position against an interior shoulder 28 of the connection adapter 20 with the valve 22 being guided and movable along the valve guide 24 in a longitudinal direction along the path of fluid flow within the nipple 14. The valve spring 26 resiliently urges the valve 22 against an interior shoulder 30 of the nipple body 18 in a normally-closed position, and an elastomeric seal 32 on the valve 22 creates a normally-closed fluid-tight seal within the nipple 14 thereby preventing flow through the nipple 14. The valve 22 of the nipple 14 remains in the normally-closed position during most stages of connection with the coupler 12 until a final stage of connection with the coupler 12 when the valve 22 is urged in an open condition as discussed in greater detail below.

Figure 2:
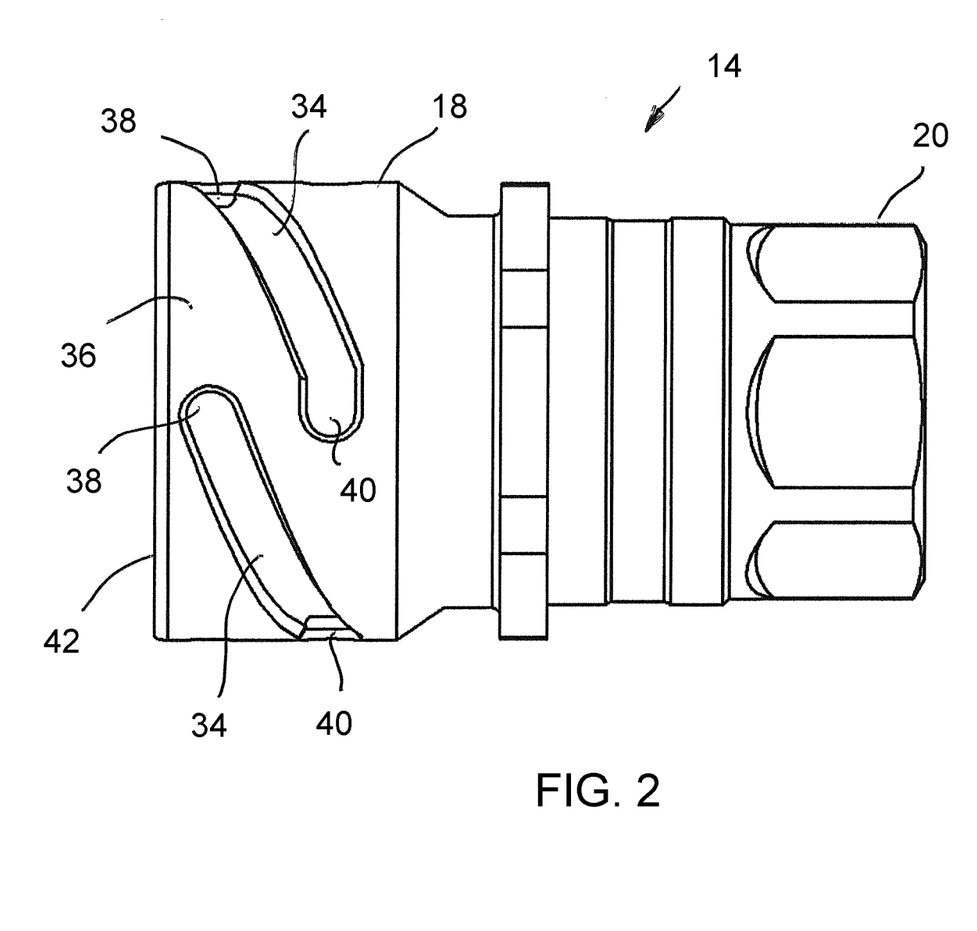
FIG. 2 is an elevational side view of the nipple of the coupling of FIG. 1.
Figure 3:
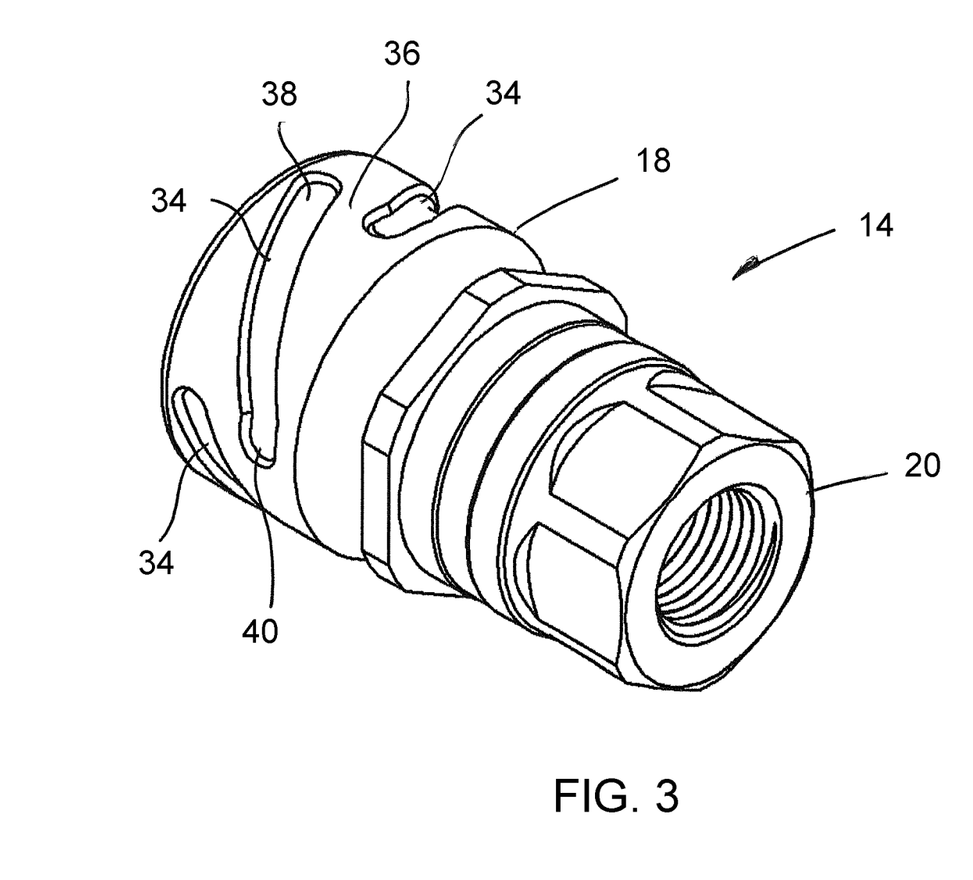
FIG. 3 is a perspective view of a distal end of the nipple of FIG. 1.
Figure 4:
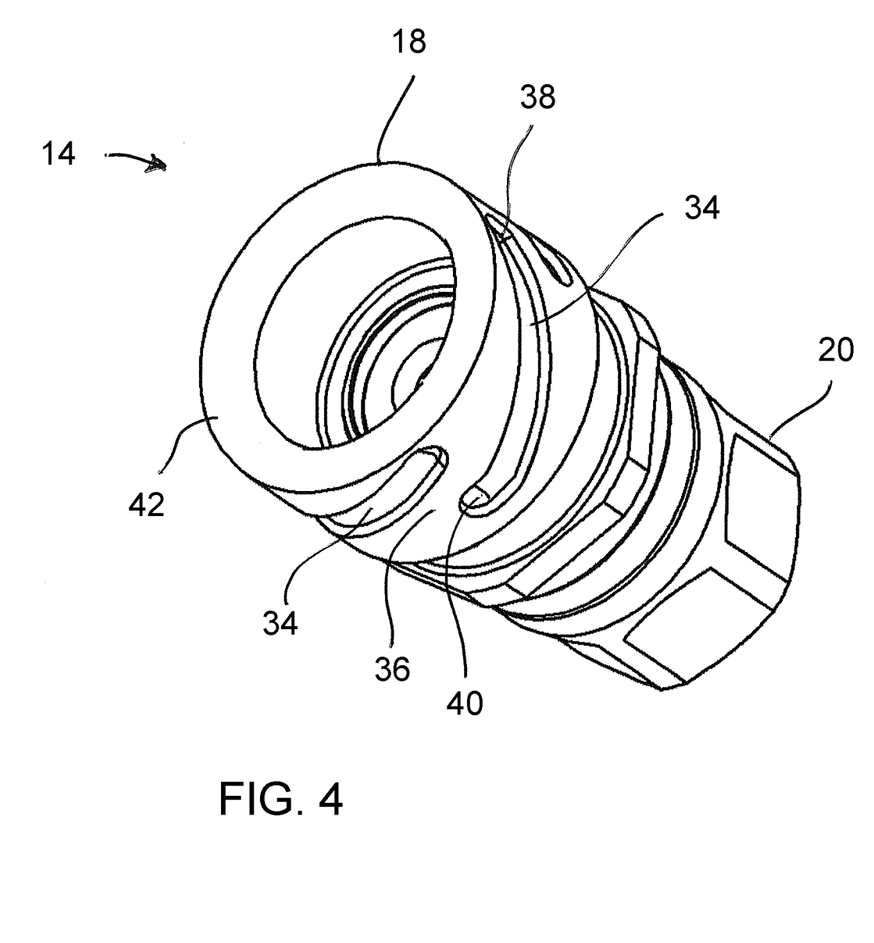
FIG. 4 is a perspective view of a proximate end of the nipple of FIG. 1.

The nipple body 18 forms the proximal end of the nipple 14 which faces and engages the coupler 12 during connection. A plurality of separate, spaced-apart cam paths 34 in the form of generally helical grooves are formed in an outer peripheral surface 36 of the nipple body 18. Each cam path or groove 34 has a proximal closed end 38 and an opposite distal closed end 40. For instance, see FIG. 2. The proximal end 38 of each of the cam paths 34 terminates a pre-determined spaced distance from the end face 42 of the nipple body 18. Thus, the cam paths 34 do not extend completely to and through the end face 42 of the nipple body 18 to provide a significant safety feature of the coupling 10 that prevents uncontrolled ejection of a coupler 12 (which includes a component that engages the cam paths) from the nipple 14 and ensure proper engagement between the coupler 12 and nipple 14. The distal closed end 40 of each of the cam paths 34 may terminate in a short circumferentially-extending part of the cam paths 34 providing a detent as best shown in FIG. 2.

Figure 6:
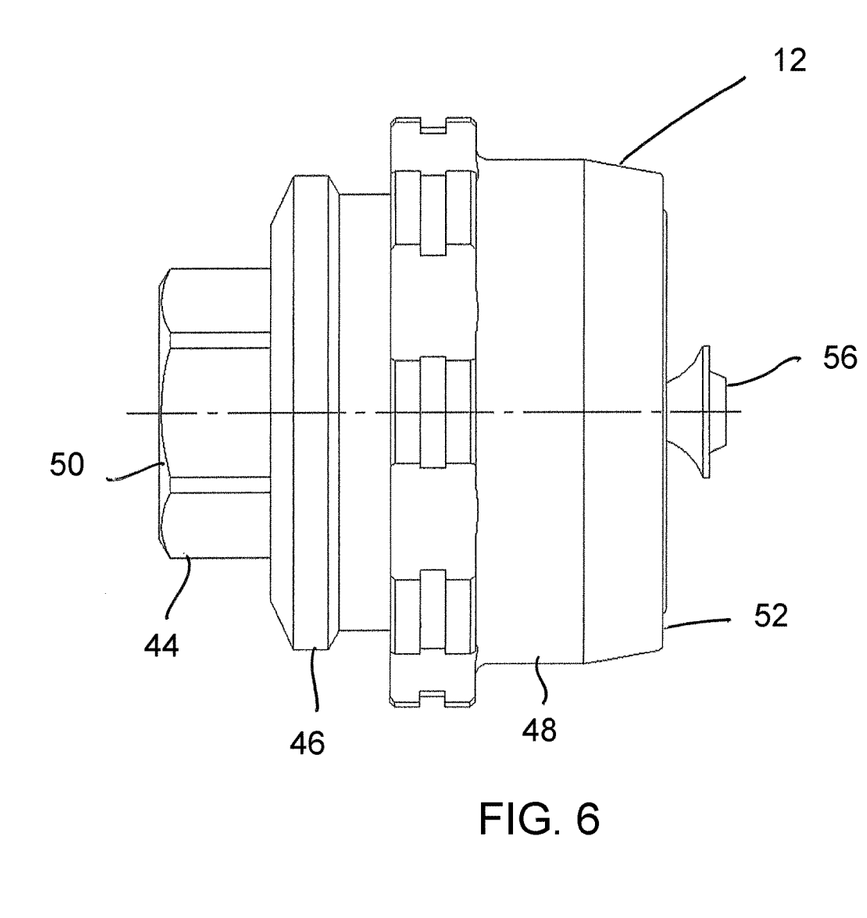
FIG. 6 is an elevational side view of the coupler of the coupling of FIG. 1.
Figure 7:
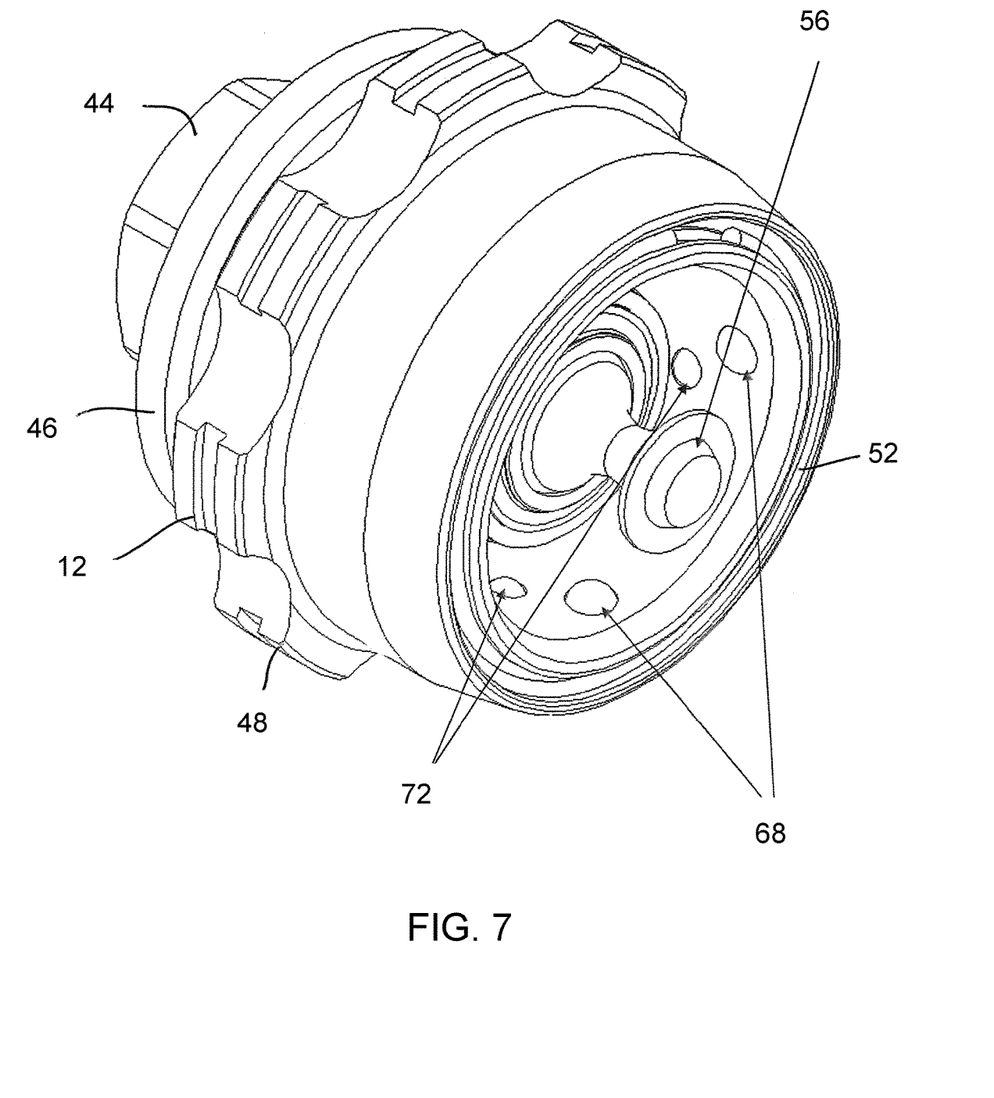
FIG. 7 is a perspective view of the coupler of FIG. 1.
Figure 8:
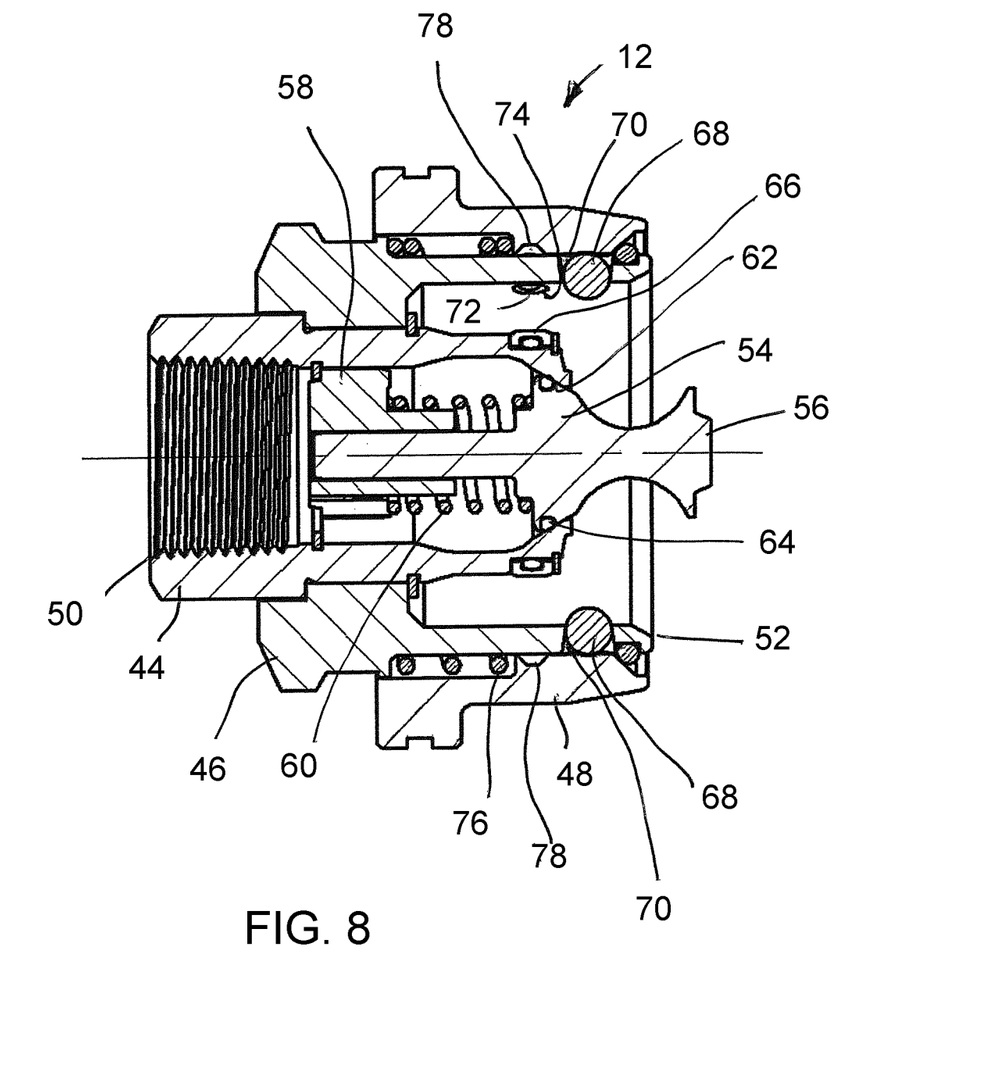
FIG. 8 is a cross-sectional view along the length of a coupler in accordance to an embodiment.

Turning to the separate structure of the coupler 12 (which forms the delivering side of the coupling 10 when engaged with the nipple 14) shown in FIGS. 6-8, it includes a hollow socket body 44, a hollow cam-engagement housing 46 connected to the socket body 44, and a sleeve 48 carried by and movable in opposite longitudinal directions on the cam-engagement housing 46.

The socket body 44 has an end 50 that connects to a hose, hose fitting, or the like (not shown) and an opposite end 52 that faces and is configured to be connected to the nipple 14. A valve 54 is located within the socket body 44 and includes a valve head section 56 that extends through and beyond the face of the end 52 of the cam-engagement housing 46. A valve guide 58 is supported in a stationary position within the socket body 44, and the valve 54 is movable relative to the valve guide 58 in a longitudinal direction within the coupler 12. A valve spring 60 is captured between the valve guide 58 and valve 54 to resiliently urge the valve 54 in a normally-closed position preventing fluid flow through the coupler 12. In this position, a part of the valve 54 having a valve seal 64 engages an annular tapered lip 62 of the socket body 44 to create a normally-closed fluid-tight seal.

The socket body 44 carries an elastomerically energized ultra-high molecular weight (UHMW) cup seal 66 extending thereabout. See FIG. 8. As will be discussed in greater detail below, this seal 66 creates a fluid tight seal with an inner diameter surface of the nipple body 18 during an early stage of connection of the coupler 12 to the nipple 14 thereby preventing or reducing unwanted release of fluid, such as $CO_2$, during connection and disconnection processes.

The cam-engagement housing 46 and sleeve 48 cooperate to provide the coupler 12 with two different retention ball systems, including a set of latching balls 68 and a separate set of locking balls 72. As best shown in FIG. 7, the set of latching balls 68 is located closer to the end 52 of the coupler 12 than the locking balls 72, and the locking balls 72 are spaced a pre-determined distance behind the latching balls 68 relative to the end 52 of the coupler 12.

Each of the latching balls 68 may be seated within and partially protrude through tapered openings 70 in the cam-engagement housing 46, but may not completely pass through the tapered openings 70. For example, as best illustrated in FIG. 8, when the sleeve 48 is in a normal position (as shown in FIG. 8), which is hereinafter referred to as the normal forward position of the sleeve 48, an inner peripheral surface of the sleeve 48 locks the latching balls 68 in an inward position (i.e., radially inward relative to the coupler 12). See FIG. 8. In this inward position, the nipple 14 may not be inserted into the coupler 12 beyond the latching balls 68 because the outer peripheral surface of the nipple 14 cannot fit through the reduce-sized opening created within the coupler 12 by the latching balls 68 protruding through the openings 70.

The sleeve 48 may be positioned in the normal forward position as shown in FIG. 8 or in a retracted position in which the sleeve 48 is slid rearward in a longitudinal direction away from the end 52 of the coupler that engages the nipple 14. When the sleeve 48 is caused to be slid to the retracted position via the hand of the operator, the latching balls 68 are no longer trapped in the inward position and are permitted to extend to an outward position (i.e., radially outward relative to the coupler 12) such that they no longer protrude through the openings 70 and no longer restrict the nipple 14 from passing through the coupler. For example, see the position of the sleeve 48 as shown in the retracted position in FIG. 10 and see the latching balls 68 deflected to the outward position by the nipple 14.

In addition to preventing or permitting passage of the nipple 14 through the coupler 12, the latching balls 68 can also be manipulated to engage cam paths 34 of the nipple 14 for purposes of latching the coupler 12 to the nipple 14. Thus, the number and spacing of latching balls 68 may match the number and spacing of cam paths 34 in a manner permitting the latching balls 68 to register with the cam paths 34. The number of latching balls or cam paths may be two or more, such as three to twelve or more in larger sized couplings.

Figure 11:
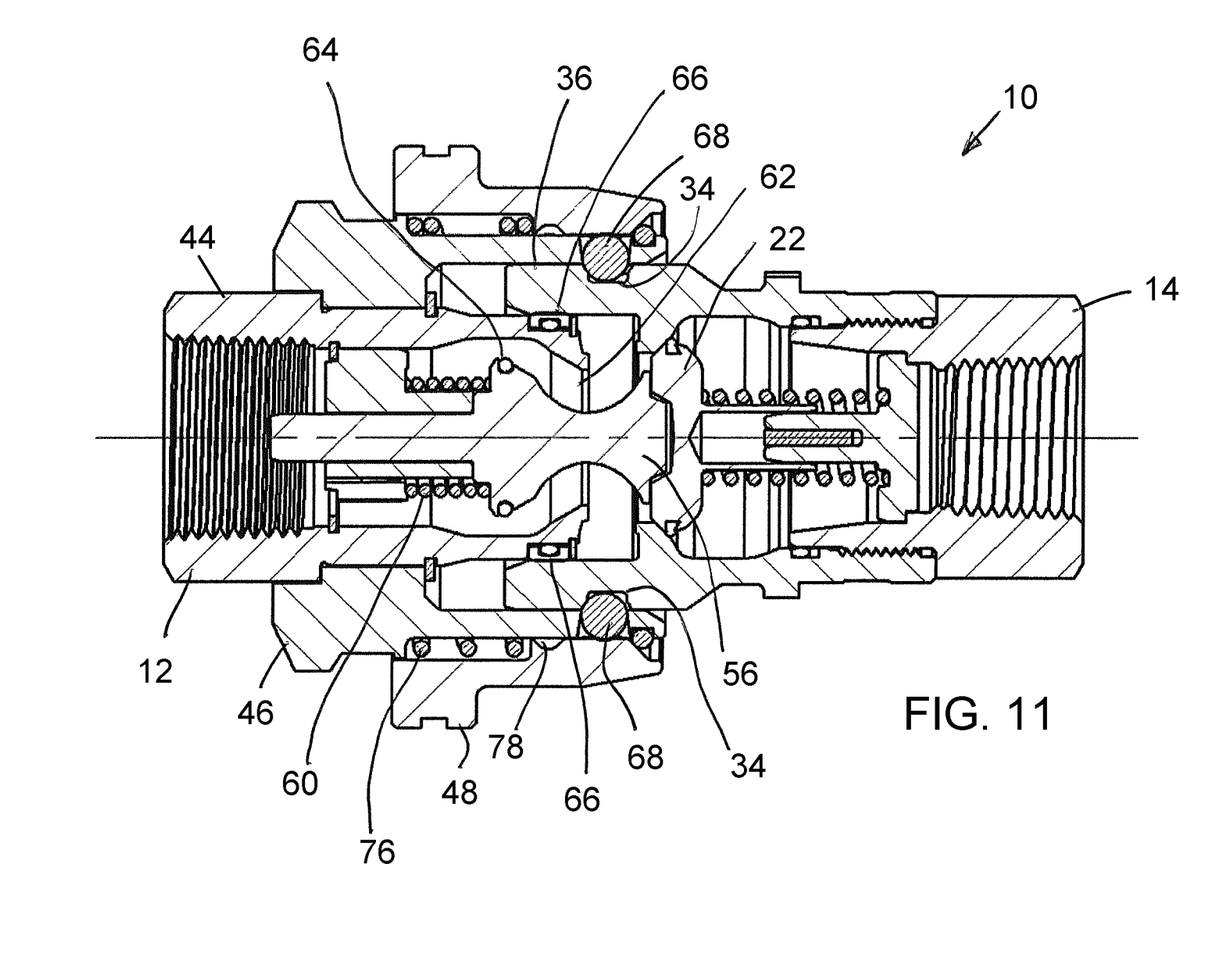
FIG. 11 is a cross-sectional view of the coupler and nipple of FIG. 9 upon an intermediate stage of engagement in accordance to an embodiment.

As best shown in FIG. 11, when the latching balls 68 register with cam paths or grooves 34, a sleeve spring 76 retained on the cam-engagement housing 46 resiliently and automatically urges the sleeve 48 into the normal forward position. In this position, the latching balls 68 are once again captured in the inward position protruding through openings 70. Thus, the latching balls 68 engage the cam paths 34. In this condition, the coupler 12 is connected to the nipple 14 and cannot be accidentally disconnected from the nipple 14 provided the sleeve 48 remains in the normal forward position. This is because the cam paths 34 terminate in closed proximal ends 38 that do not extend through the end face 42 of the nipple body 18.

In addition to the set of latching balls 68, a set of locking balls 72 also extend through tapered openings 74 in the cam-engagement housing 46. Similar to the latching balls 68, each of the locking balls 72 may be seated within and partially protrude through the tapered openings 74 in the cam-engagement housing 46, but may not completely pass through the tapered openings 74.

When the sleeve 48 is in a normal position (as shown in FIG. 8), at least one recess 78 formed in the inner peripheral surface of the sleeve 48 is in alignment with the locking balls 72 so that the locking balls 72 may retract outwardly and not protrude through the tapered openings 74. However, when the sleeve 48 is placed in the retracted position, the inner peripheral surface of the sleeve 48 captures the locking balls 72 in an inward position (i.e., radially inward relative to the coupler 12). In this inward position, the nipple 14 (although able to be inserted beyond the latching balls 68) may not be inserted into the coupler 12 beyond the locking balls 72 because the outer peripheral surface of the nipple 14 cannot fit through the reduce-sized opening created within the coupler 12 by the locking balls 72 protruding through the openings 74.

Accordingly, when the end face 42 of the nipple 14 is abutted against the locking balls 72, the latching balls 68 will have been advanced on the nipple 14 a needed distance to engage within the proximal closed ends 38 of the cam paths 34. If the latching balls 68 are not registered with the cam paths 34, the coupler 12 may be slightly moved or rotated relative to the nozzle until the latching balls 68 align with and are received within the proximal closed ends 38 of the cam paths 34. As this occurs, the sleeve 48 will automatically and resiliently return to the normally forward position in which the recess 78 will again be in alignment with the locking balls 72.

When the locking balls 72 are aligned with the recess 78, the locking balls 78 are permitted to move outwardly thereby permitting the nipple 14 to be advanced further into the coupler 12 beyond the location of the locking balls 72. The further advancement is accomplished by rotation of the coupler 12 relative to the nipple 14 as controlled by the latching balls 68 following the helical path of the cam paths 34. Shortly after initiation of the rotation, the locking balls 72 are captured within the recess 78 of the sleeve 48 by the confronting outer diameter surface 36 of the nipple 14. The locking balls 72 ride along and engage a path on an outer diameter of the nipple body 18 between the cam paths 34 and do not enter the cam paths 34. In this position, the locking balls 72 are able to prevent the sleeve 48 from inadvertently moving to the retracted position. This prevents any accidental disconnection of the coupler 12 from the nipple 14 due to unwanted moving of the sleeve which would otherwise permit the latching balls 68 to be disengaged from the cam paths 34.

FIGS. 9-12 show the various stages of engagement of the coupler 12 to the nipple 14 during a connection or disconnection process and show valve operation occurring within the coupling 10 during the different stages.

Figure 9:
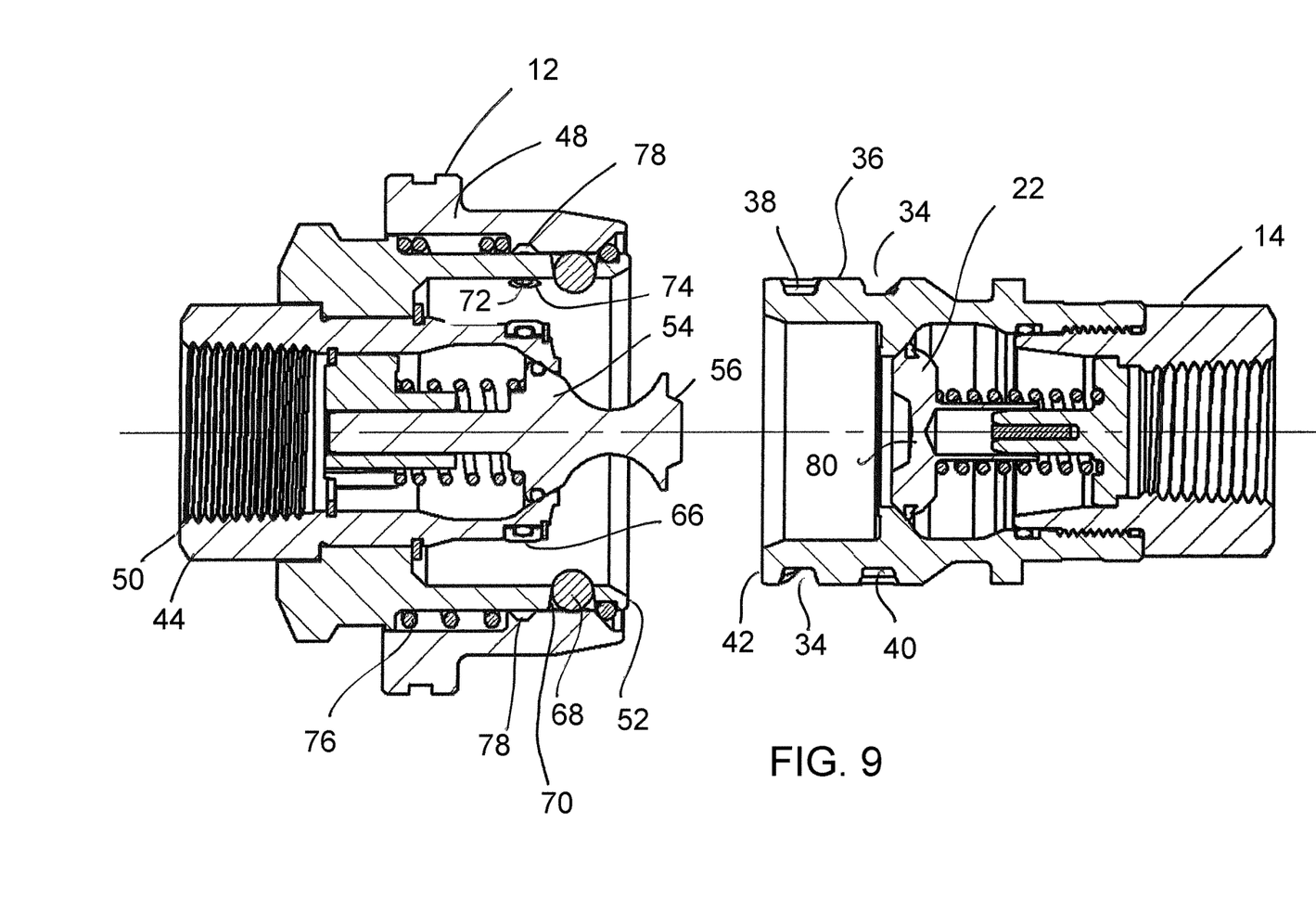
FIG. 9 is a cross-sectional view of a coupler and nipple in a disconnected condition in accordance to an embodiment.

In FIG. 9, the coupler 12 and nipple 14 are shown in a completely disengaged arrangement. The valves 54 and 22 within the coupler 12 and nipple 14, respectively, are in the normally-closed condition as discussed above and no release of the cryogenically controlled liquid through either the coupler 12 or nipple 14 is enabled. In addition, the sleeve 48 is shown in a normal forward position on the cam-engagement housing 46 via the force of the sleeve spring 76.

When the sleeve 48 is in the normal forward position as shown in FIG. 9, the latching balls 68 are captured in an inward most position such that the latching balls 68 protrude through the openings 70 preventing passage of the nipple 14. In this position, the latching balls 68 cannot extend over the lip of the end face 42 of the nipple 14. Thus, the coupler 12 cannot be engaged with the nipple 14 in the condition shown in FIG. 9. However, the coupler 12 can be slightly applied on the nipple 14 such that the end face 42 of the nipple is flush and square against the inwardly protruding latching balls 68 of the coupler 12.

Figure 10:
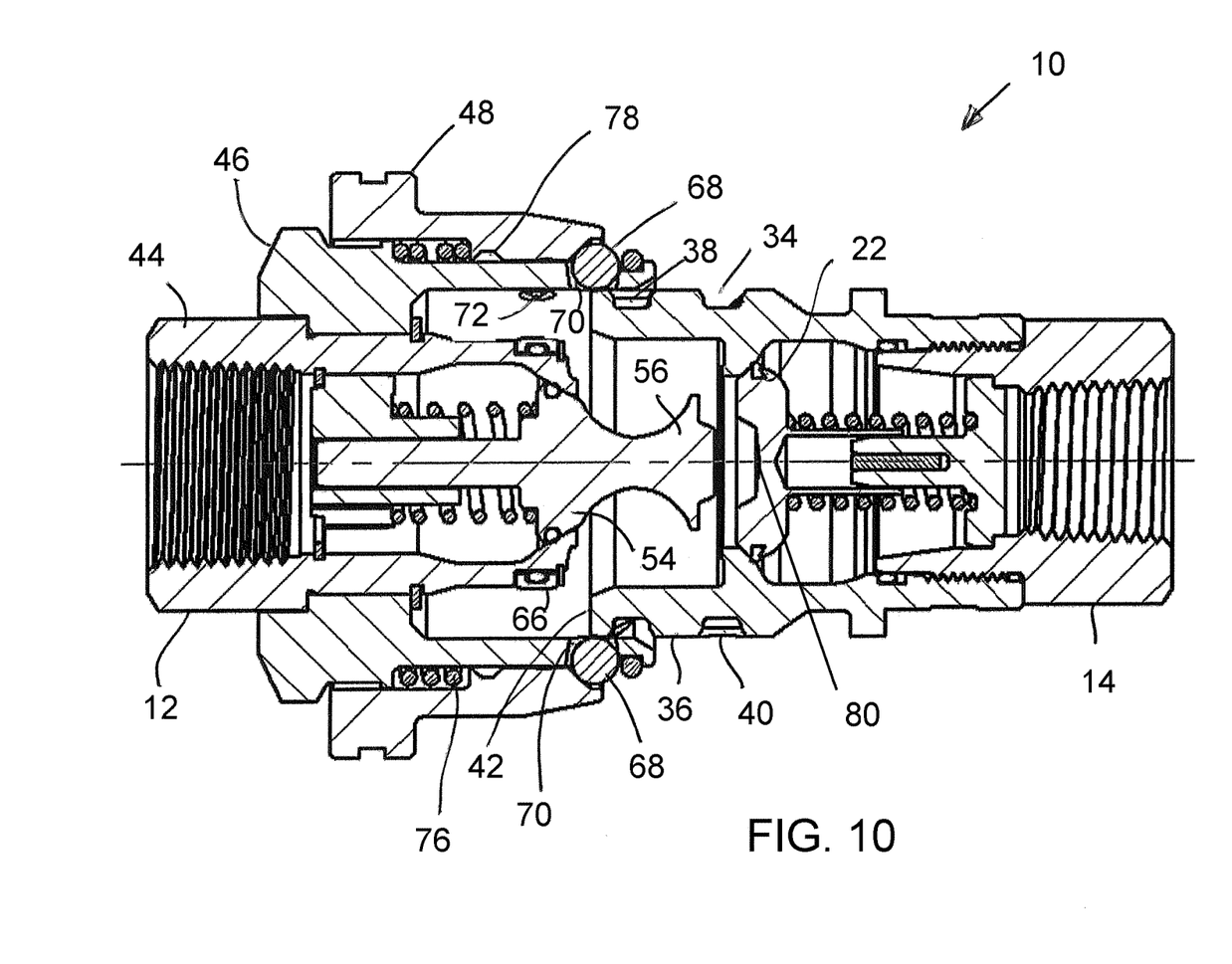
FIG. 10 is a cross-sectional view of the coupler and nipple of FIG. 9 upon an initial stage of engagement in accordance to an embodiment.

FIG. 10 shows the condition of the coupler 12 relative to the nipple 14 when an operator grips and pulls the sleeve 48 against the force of the sleeve spring 76 in a rearward direction and into the retracted position on the cam-engagement housing 46. In this retracted position, the set of latching balls 68 are permitted to move outward to permit the cam-engagement housing 46 and set of latching balls 68 to extend over and onto the lip of the nipple body 18. See FIG. 10.

As shown in FIG. 10, in this early stage of the connection process, both valves 54 and 22 remain normally-closed and the head section 56 of the valve 54 is spaced from a complementary receiving surface 80 of the valve 22 of the nipple 14. Also, in FIG. 10, the cross section is shown such that the closed proximal ends 38 of one of the cam paths 34 and an opposite closed distal end 40 of another one of the cam paths 34 are shown.

The coupler 12 may be advanced onto the nipple 14 from the position shown in FIG. 10 until the end face 42 of the nipple abuts against the locking balls 72 which are caused to protrude through openings 74 due to the sleeve 48 being positioned in the retracted position as discussed above. In this condition, the latching balls 68 extend a sufficient distance onto the nipple 14 to engage within the closed proximal ends 38 of the cam paths 34. If this engagement has not yet occurred, slight rotation of the coupler about the nipple 14 will provide proper alignment for the engagement of the latching balls 68 with the cam paths 34.

When the latching balls 68 engage the cam paths 34, the sleeve 48 returns to the normal forward position thereby trapping the latching balls 68 within the cam paths 34 and permitting the locking balls to extend into the recess 78. At this stage of the connection process, both valves 54 and 22 remain normally-closed; however, the head section 56 of the valve 54 is now abutted against the complementary receiving surface 80 of the valve 22 of the nipple 14.

In this condition, the operator now must rotate the coupling 12 about one-quarter to one-eighth of a turn relative to the nipple 14 to advance the coupling 12 further and fully onto the nipple 14 since the latching balls 68 must follow the helical path defined by the cam paths 34.

FIG. 11 shows the stage of the process in which the latching balls 68 have traveled approximately half the distance from the closed proximal ends 38 to the closed distal ends 40 of the cam paths 34. At this stage in the process, the head section 56 of valve 54 engages the complementary receiving surface 80 of the valve 22 and causes the valve 54 in the coupler 12 to be urged into an open flow condition. However, the valve 22 in the nipple remains in the normally closed position.

In addition, with the sleeve 48 in the normal forward position, the locking balls 72 are aligned with the recess 78 and firmly engaged between the sleeve 48 within the recess 78 and an outer diameter of the nipple body 18 between and outside of the cam paths 34. The locking balls 72 are offset from the latching balls 68 and are never in a position to engage the cam paths 34. The importance of this arrangement is that, in this condition, the sleeve 48 cannot be moved relative to the cam-engagement housing 46. Thus, the sleeve 48 is locked in the forward position. This prevents the latching balls 68 from losing engagement with the cam paths 34 due to inadvertent movement of the sleeve 48.

Also, in FIG. 11, the O-ring energized UHMW seal 66 of the socket body 44 of the coupler 12 has engaged and forms a fluid-tight seal against the inner diameter of the nipple body 14. Thus, even though the valve 54 in open, the seal 66 prevents undesired escape of the fluid from the coupling 10.

Figure 12:
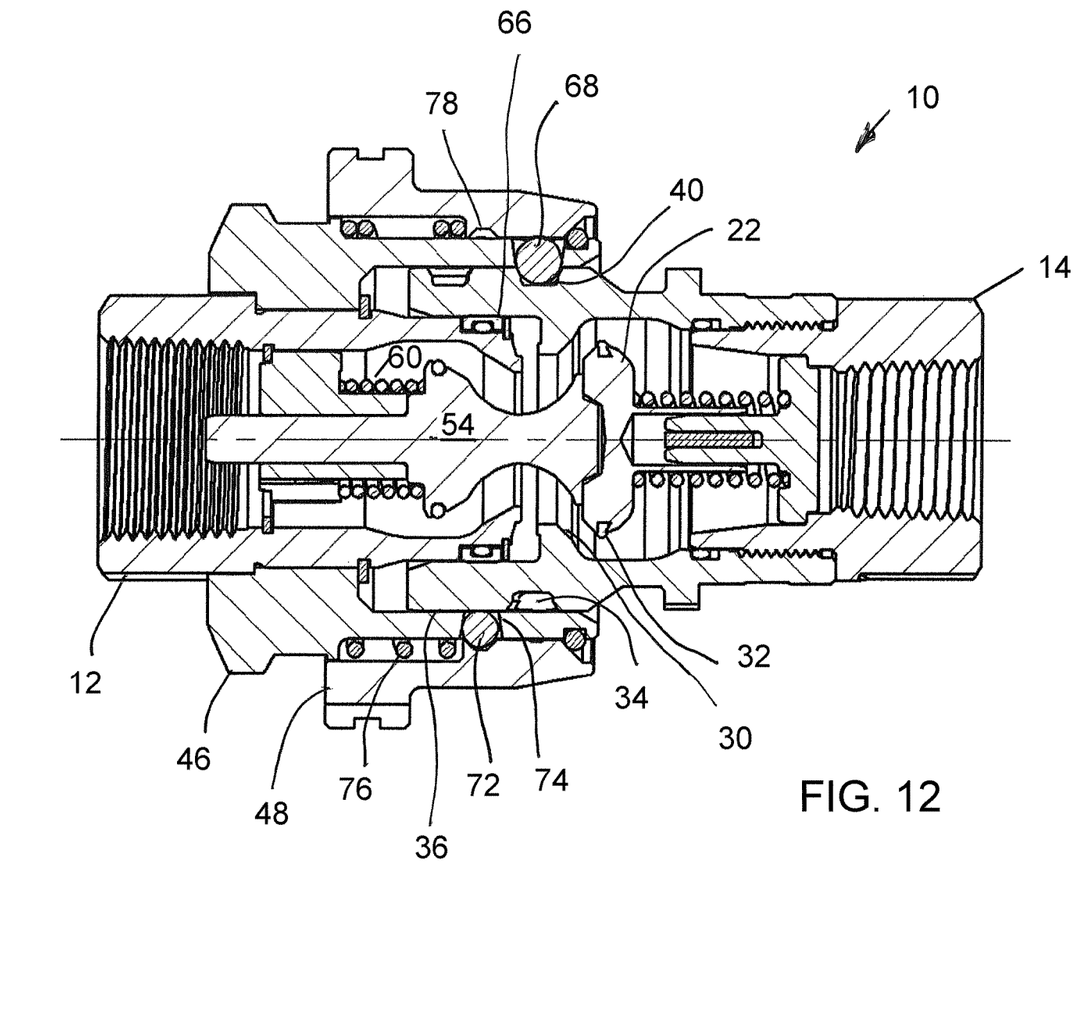
FIG. 12 is a cross-sectional view of a coupler fully engaged with a nipple in accordance to an embodiment.

FIG. 12 shows the coupler 12 after it has been fully rotated to a final connection condition. Here, the latching balls 68 have been fully advanced within the cam paths 34 into the circumferentially-extending ends 40 of the cam paths 34 where the cam paths 34 terminate and form a detent. The circumferentially-extending ends 40 (i.e., detents) of the cam paths 34 prevent movement or rotation of the coupler 12 relative to the nipple 14. In addition, this further advancement of the coupler 12 relative to the nipple 14 causes the fully compressed valve spring 60 and valve 54 of the coupler 12 to provide a force against the valve 22 of the nipple 14 to position the valve 22 in an open position permitting flow through the nipple 14 and through the coupling 10.

Accordingly, in the position shown in FIG. 12, the cryogenically controlled liquid may flow through the coupling 10 for delivery to the receiving facility and a fluid-tight seal between the coupler 12 and nipple 14 has been created to prevent any leakage or escape of the low temperature liquid under high pressure. Further, the latching balls 68 are captured by the sleeve 48 within the cam paths 34 and the locking balls 72 prevent inadvertent movement of the sleeve 48. Accordingly, any accidental disconnection of the coupler 12 from the nipple 14 is prevented.

The above referenced steps are performed in reverse relative to disconnecting the coupler 12 from the nipple 14. An operator would first rotate the coupler 12 relative to the nipple 14 for about a one-eighth to one-quarter turn. This moves the latching balls 68 to the closed proximal ends 38 of the cam paths 34. As this occurs, first the valve 22 of the nipple 14 is permitted to return to a normally-closed position, such as shown in FIG. 11, and then the valve 54 of the coupler 12 is returned to a normally-closed position. This minimizes any possible exposure of $CO_2$ or the like to the operator and prevents any damage that may be caused by the liquid being under high pressure. In this condition, the locking balls 72 extend beyond the lip of the nipple body 18 thereby allowing the operator to pull the sleeve into the retracted position to enable disengagement of the latching balls 68 relative to the cam paths 34. The coupler 12 can then be removed from the nipple 14.

The foregoing description and specific embodiments are merely illustrative of the principles thereof, and various modifications and additions may be made to the apparatus by those skilled in the art, without departing from the spirit and scope of this invention.

We claim:

1. A fluid coupling, comprising:
   a nipple; and
   a coupler adapted to be connected to and disconnected from said nipple;
   said nipple defining a flow path therethrough and having a valve located therein that prevents flow through said nipple when in a normally-closed position, said nipple having an outer peripheral surface with a plurality of separate, spaced-apart cam paths formed therein;
   said coupler defining a flow path therethrough and having a valve located therein that prevents flow through said coupler when in a normally-closed position, said coupler including a set of latching balls for engagement with said nipple within said cam paths to secure said coupler to said nipple;
   said coupler including a sleeve mounted on and extending about said coupler, said sleeve being movable relative to said coupler between a normally-forward position and a retracted position such that in said normally-forward position, said set of latching balls are forced into an inward position that prevents release of the latching balls from said cam paths, and in said retracted position, said set of latching balls are permitted to extend to an outward position enabling disengagement with said cam paths; and
   each of said cam paths being in a form of a helical groove that has a closed proximal end that terminates and does not extend through an end face of said nipple and a closed distal end, whereby said latching balls of said coupler are required to be located in said outward position to enable said coupler to be initially advanced onto said nipple to an extent permitting engagement of said latching balls with said cam paths.

2. The fluid coupling according to claim 1, wherein each of said closed distal ends of said cam paths include a circumferentially-extending end section forming a detent.

3. The fluid coupling according to claim 1, wherein said coupler further includes a set of locking balls spaced from said set of latching balls, and wherein said sleeve includes at least one recess for receiving said locking balls when said sleeve is in said normally-forward position, whereby, when said latching balls of said coupler are engaged with said cam paths of said nipple and said locking balls are engaged with said outer peripheral surface of said nipple, said locking balls are captured within said at least one recess of said sleeve and prevent said sleeve from being moved to said retracted position.

4. The fluid coupling according claim 3, wherein, when said sleeve is in said retracted position, said locking balls are trapped in an inward position preventing passage of said nipple beyond said locking balls, and wherein, when said latching balls are in position to engage said closed proximal end of said cam paths, said locking balls are located to abut an end face of said nipple.

5. The fluid coupling according to claim 1, wherein, when said latching balls are engaged within said closed proximal end of said cam paths, said valves within said nipple and coupler remain in said normally-closed positions.

6. The fluid coupling according to claim 1, wherein said valves of said nipple and coupler include complementary mating surfaces such that as said coupler is rotated about said nipple as controlled by movement of said latching balls within said helical grooves of said cam paths, said valve in said coupler is caused to be urged into an open position before said valve of said nipple.

7. The fluid coupling according to claim 1, wherein, when said coupler is rotated about said nipple such that said latching balls are located in said closed distal ends of said cam paths, said valves in said coupler and nipple are both caused to be urged in open positions thereby permitting flow through said coupling.

8. The fluid coupling according to claim 1, wherein each of said coupler and said nipple include a valve spring for resiliently urging said valves of said coupling and said nipple into said normally-closed positions, and wherein a spring is located on said coupler for resiliently urging said sleeve into said normally-forward position.

9. The fluid coupling according to claim 1, wherein said coupler includes an ultra-high molecular weight (UHMW) seal supported by an O-ring, and wherein, when said latching balls are engaged within said closed proximal end of said cam paths, said UHMW seal forms a fluid tight seal with said nipple.

10. A fluid coupling, comprising:
   a coupler defining a flow path therethrough and having a valve located therein in a normally-closed position; and
   a separate nipple defining a flow path therethrough and having a valve located therein preventing flow through said nipple when in a normally-closed position;
   said coupler including a sleeve mounted on and extending about said coupler, said sleeve being movable relative to said coupler between a normally-forward position and a retracted position and having a least one recess formed on an inner peripheral surface thereof;
   said coupler including a set of latching balls such that said latching balls are locked in an inward position when said sleeve is in said normally-forward position and are permitted to extend to an outward position when said sleeve is placed in said retracted position;
   said coupler including a set of locking balls such that said set of locking balls are locked in an inward position when said sleeve is in said retracted position and are permitted to extend to an outward position within said at least one recess of said sleeve when said sleeve is placed in said normally-forward position; and
   said nipple having a plurality of separate cam paths formed in an outer peripheral surface thereof, whereby, when said coupler is advanced on and fully connected to said nipple, said latching balls of said coupler engage said cam paths of said nipple and are locked therein by said sleeve and said sleeve is locked in said normally-forward position by said locking balls.

11. The fluid coupling according to claim 10, wherein each of said cam paths is in the form of a helical groove that has a closed distal end opposite a closed proximal end that terminate and do not extend through an end face of said nipple.

12. The fluid coupling according to claim 11, wherein said valves of said nipple and coupler include complementary mating surfaces such that, when said latching balls are located and engaged within said proximal ends of said cam paths, said valves within said nipple and coupler remain in said normally-closed positions, and when said latching balls are located and engaged within said distal ends of said cam paths, said valves within said nipple and coupler are urged into an open condition thereby permitting flow through the coupling.

13. The fluid coupling according to claim 11, wherein said coupler is adapted to be advanced on said nipple by rotation about said nipple in which said latching balls travel within said cam paths from said proximal end to said distal end, and wherein said valves in said coupler and nipple become engaged as said coupler is advanced on said nipple such that said valve in said coupler is caused to be urged into an open position before said valve of said nipple.

14. A method of assembling a fluid coupling, comprising the steps of:
   positioning a coupler against a nipple such that a set of latching balls carried within the coupler are locked in an inward position preventing advancement of the coupler onto the nipple;
   locating a sleeve on the coupler to a retracted position to permit the latching balls to extend outwardly thereby permitting the coupler to be advanced onto the nipple until a set of locking balls carried within the coupler and locked in an inward position by the sleeve in the retracted position prevents further advancement of the coupler onto the nipple;
   moving the coupler on the nipple until the latching balls engage within closed helical cam paths formed in an outer peripheral surface of the nipple causing said sleeve to resiliently return to a normal position that locks said latching balls in the inward position and that permits said locking balls to extend outwardly; and
   after said latching balls engage said cam paths, rotating said coupler relative to the nipple to advance the coupler onto the nipple as the latching balls follow the cam paths to a fully coupled position.

15. The method according to claim 14, wherein, when said latching balls engage said cam paths during the step of moving the coupler on the nipple, separate valves in each of said coupler and nipple remain in normally-closed positions preventing flow through each of the coupler and the nipple.

16. The method according to claim 15, wherein, during the step in which the coupler is rotated relative to the nipple, the valve in the coupler is urged into an open condition before the valve in the nipple is opened and the locking balls prevent movement of the sleeve to the retracted position.

17. The method according to claim 15, wherein, when the coupler is in the fully coupled position relative to the nipple, the valves in both the coupler and the nipple are urged into an open condition permitting flow through the coupling.

18. The method according to claim 14, wherein said coupler is located on a supply side of fluid flow through the coupling and said nozzle is located on a receiving side of the fluid flow through the coupling, and wherein the fluid is a cryogenically controlled liquid.

* * * * *